March 27, 1928. 1,663,704
W. L. HOLZMANN
EGG CANDLER
Filed Oct. 12, 1925 2 Sheets-Sheet 2
Fig. 2.
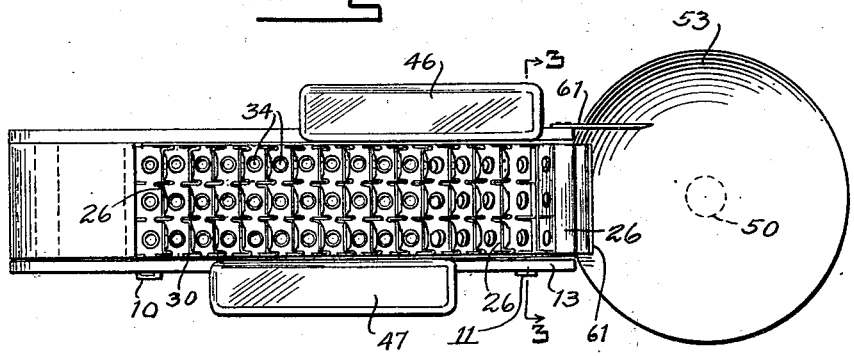
Fig. 3.
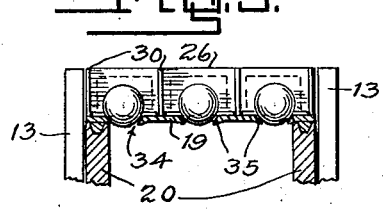
Fig. 6.
Fig. 7.
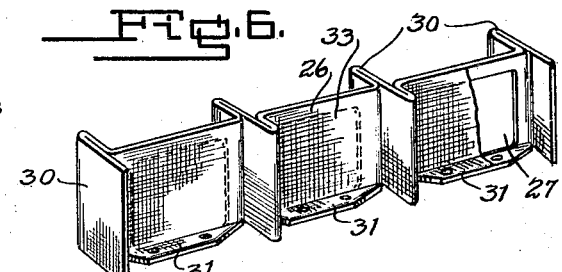
Fig. 5.
Fig. 4.
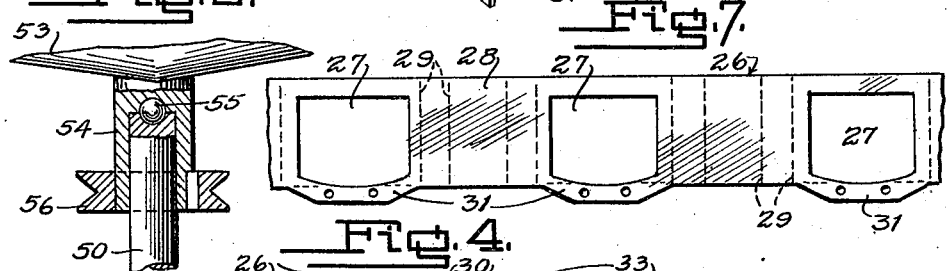
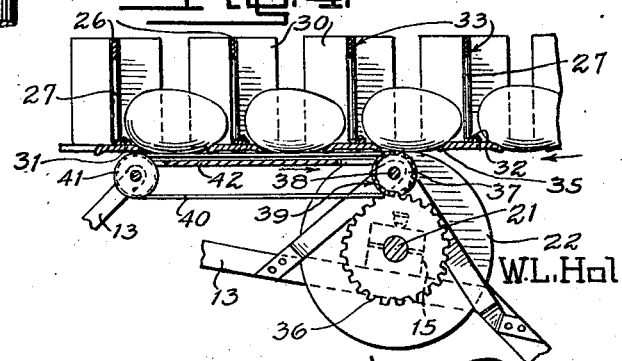
W. L. Holzmann
Inventor
By Lancaster and Allwine
Attorneys Patented Mar. 27, 1928.

1,663,704

UNITED STATES PATENT OFFICE.

WILLIAM L. HOLZMANN, OF NORTH FREEDOM, WISCONSIN.

EGG CANDLER.

Application filed October 12, 1925. Serial No. 62,046.

The present invention relates to candling machines, and has for an object to provide a machine of relatively large capacity for operation by one or two persons and which may be successfully used in country stores, and other places where eggs are brought in by farmers and the like for distribution.

Another object of the invention is to provide a machine of this character for turning over or agitating the egg and its contents to more clearly disclose during the subjection of the egg to the light the presence of any meat or blood spots which may be present in the egg and which is the determining factor as to the freshness of the egg.

The invention also provides an improved structure of machine which may be operated from a relatively small electric motor and which is of condensed and simple construction so that it may be economically produced and consequently capable of general use.

A further object of the invention is to provide improved means for ejecting the select eggs from the machine and positioning such eggs in a relatively small tray or support where they may be easily picked up for crating or the like.

The above and various other objects and advantages of this invention will in part be described in, and in part be understood from the following detailed description of the present preferred embodiment, the same being illustrated in the accompanying drawings, wherein:

Fig. 2 is a top plan view of the same.

Fig. 3 is a fragmentary enlarged transverse section taken on the line 3—3 of Fig. 2, and showing the conveyor and upper part of the frame.

Fig. 4 is a fragmentary enlarged section taken through the upper portion of the machine, showing a number of eggs on the conveyor and showing the turning or agitating means for the eggs.

Fig. 5 is a fragmentary sectional view through the rotary receiving tray into which the select eggs are deposited.

Fig. 6 is a detail perspective view of one of the transverse partitions carried by the conveyor; and Fig. 7 is a fragmentary plan view of a blank from which a partition is made.

Figure 1:
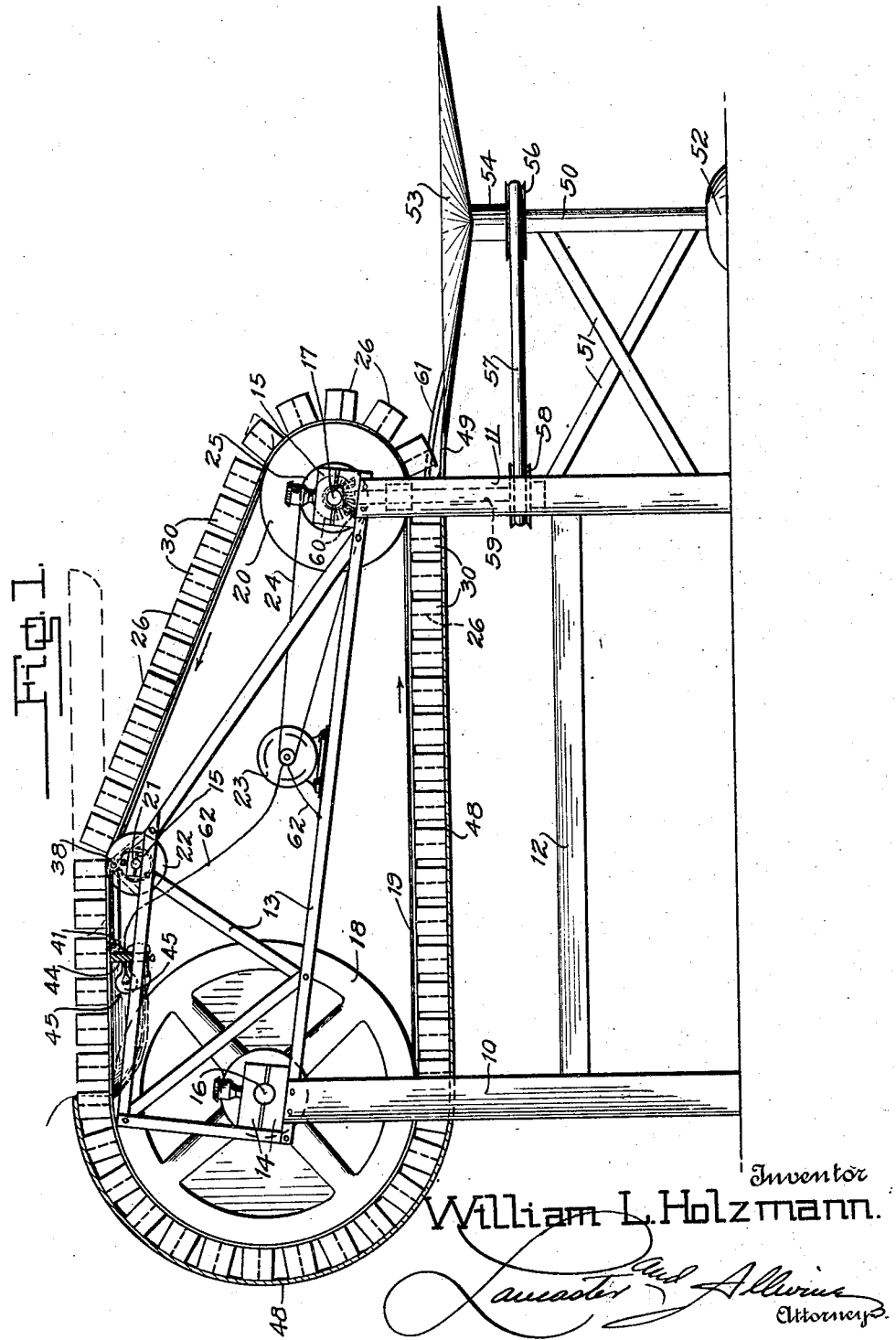
Fig. 1 is a side elevation of an egg candling machine constructed according to the present invention.

Referring to the drawings 10 and 11 designate pairs of legs or uprights arranged at the forward and rear ends of the machine and which are reinforced by braces 12 or the like. The rear uprights 10 are of greater height than the front uprights 11 and a frame 13 is arranged longitudinally between the pairs of uprights 10 and 11 and carries in its opposite ends bearing blocks 14 and 15 in which are mounted transverse shafts 16 and 17. The shaft 16 at the inner end of the machine carries a relatively large pulley or roller 18 over which is supported an endless conveyor 19 of leather belting or the like.

The forward shaft 17 is provided with a drive roller 20 which is of considerable less diameter than the idle pulley 18 and which is so mounted in the frame 13 as to dispose the lower side of the drive pulley 20 in substantially the same horizontal plane with the lower side of the idle pulley 18. The intermediate upper portion of the frame 13 carries a transverse shaft 21 on which a roller 22 is mounted, and the roller 22 is spaced a short distance forwardly of the idler 18 and with its upper side substantially in the horizontal plane of the upper side of the idler 18.

The frame 13 is provided at a suitable point with a motor 23 connected by a drive belt 24 with a pulley 25 on the front shaft 15 to turn the same and the drive roller 20 for operating the endless belt 19.

The drive belt 19 is provided with a plurality of suitably spaced apart transverse partitions, shown in detail in Figs. 6 and 7. Each partition 26 comprises a sheet metal blank or strip which has spaced openings 27 therein, and connecting web portions 28 which are folded on lines 29 into oppositely and laterally extending wings 30 forming between the same and the slotted portions of the partition separate compartments adapted to individually receive eggs therein. The partition 26 is provided along its lower edge with laterally bent flanges 31 adapted to lie between the wings 30 and against the outer side of the conveyor or drive belt 19. Rivets 32 or the like are employed, as shown in Fig. 4, for securing the flanges 31 across the belt 19.

The partition walls, or the main apertured portions of the partitions 26 between the wings 30 are provided with fillers or coverings 33 of flexible material which are secured over the openings 27 and which provide flexible walls for the partitions at the points where the eggs come into contact with the partitions to prevent cracking and breakage of the eggs. It will be noted from Fig. 2 that the partitions 26 are disposed in sufficiently close relation as to provide seperate pockets between the opposite wings 30 and the walls of the partitions and to afford easy access to the eggs by passage of the fingers downwardly between the opposed partitions and wings.

The bottom of each compartment is formed by the belt 19, and this belt is provided with an opening 34 at the bottom of each compartment and the marginal edge portion of the belt 19 at each opening 34 is reduced in thickness to provide yielding flaps 35 adapted to flex downwardly under the weight of an egg to hold the same in the opening 34 and to insure the correct positioning of the egg in the compartment.

Means, shown more in detail in Figure 4 is provided for turning or agitating the egg immediately before submitting the egg to the light in order to have the contents of the egg in a disturbed condition as it is being tested. To accomplish this result the shaft 21 is provided with a large gear wheel 36 which meshes with a pinion 37 mounted on a shaft 38, and the latter carries a roller 39 receiving thereover a small belt 40. The belt 40 is also supported upon a second roller 41 mounted in the frame 13 in spaced relation rearwardly of the roller 38 and in position to hold the upper run of the small belt 40 against the underside of the conveyor belt 19, as shown in Fig. 4.

Arranged between the upper and lower runs of the belt 40 between the rollers 38 and 41 and carried by the frame 13 in any suitable manner, is a supporting plate 42 bearing against the underside of the upper run of the conveyor 40 and adapted to support the same against the exposed lower sides of eggs 43 which may be placed in the compartments of the conveyor belt. The conveyor 40 is driven in an opposite direction to that in which the conveyor belt 19 is operated so that the egg carried in the compartment of the conveyor belt 19 is supported upon the reversely moving belt 40 and is agitated or turned over thereby so as to set the contents of the egg in a whirling motion.

The pulley 22 is secured to the idler shaft 21 and with the forward movement of the belt 19 the pulley is rotated with its shaft 21 so that the gear 36 turns with and in the same direction as the pulley 22. The forward movement of the gear 36 turns the pinion 37 in the reverse direction so that the agitator belt 40 which is turned through the turning of the pinion moves in a reverse direction to that of the belt 19.

A supporting bar 44 is secured across the top of the frame 13 immediately behind the agitator and carries one or more lamps 45 which project from the bar in such direction as to project the rays of the lamp upwardly through the openings 34 and through the eggs which are in the compartments. A tray 46 is placed at one side of the frame 13, as shown in Figure 2, to receive eggs which under test appear to be stale and these eggs are picked out of their compartments by the operator standing beside the machine. At the opposite side, the frame 13 carries a tray 47, also shown in Figure 2, into which newly delivered eggs may be placed and which are to be tested, these eggs being placed in the compartments at the forward inclined portion of the machine.

A guard plate 48 is mounted on the frame and extends horizontally beneath the lower run of the conveyor belt 19 and in suitable relation therefrom to accommodate the partitions 26 so as to retain the eggs in the compartments when the latter are overturned in their passage to the forward end of the machine. The guard plate is carried rearwardly from the standards or uprights 10 and is curved upwardly to enclose the rear end of the conveyor belt 19 and receive the eggs as they fall out of the openings 34 on to the flexible walls 33 and on to the guard plate over which they slide as they are slid along by the partitions 26.

A chute 49 is mounted upon the forward uprights 11 in line with the guard plate 48 for receiving the eggs as they are freed from the partitions 26 as the latter are carried upwardly over the drive roller 20. Spaced forwardly of the uprights 11 is a post 50 attached by crossed braces 51 to the uprights and having a foot piece 52 resting on the floor or ground to support a rotatable tray 53. The tray 53 is provided with an upper concave face and has a depending hub 54 which engages over the upper end of the post 50. A ball bearing 55 or the like may be interposed between the top of the post 50 and the hub 54 to reduce frictional contact between the two and admit free turning of the tray 53. A pulley 56 is mounted on the hub 54 and receives a belt 57 over which is carried backwardly to a smaller pulley 58 on the lower end of the shaft 59 mounted between the uprights 11. The shaft 59 is connected to the drive shaft 17 by bevel gears 60 so that the tray 53 may be turned slowly during the operation of the machine. A spring arm 61 is mounted on one of the uprights 11 and overhangs the tray 53 for the purpose of receiving eggs thereagainst and directing them toward the lower central portion of the tray, the arm 61 being offset as shown in Fig. 2 for this purpose.

The turning of the tray 53 is adapted to retard the forward movement of the eggs so that they will not collide with each other when they are released from the compartments.

In operation, a quantity of eggs may be deposited in the tray 47 and individually removed therefrom and placed in the compartments of the conveyor belt 19. As the belt 19 moves rearwardly at its upper run, the eggs are brought to the agitator 40 so that the contents of the eggs are disturbed and set in motion. While the contents of the eggs are still in motion, the eggs are brought over the lamps 45 so that the eggs may be tested. The eggs which do not come up to the desired standard are then picked out of the compartments and may be placed in the other tray 46. As the conveyor 19 continues to move the select eggs are carried thereby downwardly over the guard plate and deposited on the chute 49 from which the eggs roll on to the rotating tray 53, the spring arm 61 directing the eggs toward the center of the tray. The tray 53 is of sufficient size to hold a large number of eggs so that the latter may be conveniently removed for packing or to be disposed of in any desired manner for shipment and sale.

An electric cord 62 may be connected to the motor 23 for driving it, and may also be extended to the lamps 45, the illustration being merely diagrammatic as the details of wiring may be carried out in any well known manner.

It is of course understood that various changes and modifications may be made in the details of construction and design of the above specifically described embodiment of this invention without departing from the spirit thereof, such changes and modifications being restricted only by the scope of the following claims.

What is claimed is:

1. An egg candling machine comprising a frame structure, an endless belt carried by the frame, means for driving the belt forwardly, an agitator belt mounted in the frame, means for turning the agitator belt in a reverse direction from the endless belt whereby to agitate the eggs, means for supporting the upper run of the agitator belt, a movable tray operable by said driving means for receiving the eggs from the endless belt whereby to retard the forward movement of the eggs, and lights in the frame, said endless belt having a plurality of open ended compartments thereon adapted to movably hold the eggs, said compartments being adapted to pass over the lights subsequent to agitation by the agitator belt.

2. An egg candling machine comprising a frame structure, a conveyor belt mounted for movement on the frame, driving means for moving the belt forwardly, an agitator belt rotatably mounted on the frame, means for cooperatively moving said agitator belt reversely of said conveyor belt, egg compartments on said conveyor belt, a supporting plate for the upper run of said agitator belt, light means mounted on said frame, a rotatable tray mounted on the frame, and a guard secured to the frame and extending outwardly above said tray whereby to prevent eggs on the tray from striking eggs released from the compartments.

3. An egg candling machine comprising a body frame, a conveyor belt rotatably mounted on said frame, driving means for moving the belt forwardly, an agitator belt on the frame and adapted for movement reversely of said conveyor belt, a plurality of compartments on said conveyor belt, said compartments comprising side and end walls, an open top and a flexible bottom, said flexible bottom being partially open to permit the egg to partially protrude therethrough for engagement with the agitator belt, a tray pivotally carried by said frame and adapted for movement by said driving means, a guard on the frame extending outwardly over said tray, light means on the frame and adapted to project light upwardly through the compartment bottoms, and a guard plate carried by the frame for retaining the eggs within the compartments.

4. An egg candling machine comprising a body frame, an endless belt rotatably carried by the frame, driving means for moving the endless belt forwardly, an agitator belt on the frame having its upper run adjacent the upper run of said endless belt, means for moving said agitator belt reversely of said endless belt, a plurality of compartments secured to said endless belt, a tray rotatably mounted on said frame and adapted to receive the eggs released from the compartments, light means for illuminating the eggs after agitation by said agitator belt, and a guard for retaining the eggs in the compartments.

5. An egg candling machine comprising a body frame, a conveyor belt mounted for rotation on the frame, driving means for driving the belt, egg retaining compartments on the belt, said compartments having an open top and a partially closed flexible bottom, agitating means mounted on the frame and adapted to agitate the eggs when they are moved with the conveyor belt, light means for illuminating the eggs subsequent to agitation, guard means on the frame for retaining the eggs in the compartments, and a pivotal receiving tray for receiving the eggs from the compartments, said tray being adapted to prevent the eggs from colliding with each other.

6. An egg candling machine comprising a frame, a conveyor belt rotatably mounted on the frame, driving means for driving the belt, egg compartments carried by the belt, agitating means on said frame for agitating the eggs in said compartments, means for moving said agitating means reversely of said conveyor belt, means for retaining the eggs in the compartments on the lower run of the belt, and a pivotal receiving tray adapted to receive the eggs from the compartments.

7. An egg candling machine comprising an endless belt, means for driving the belt, transverse partitions carried across the outer side of the belt, each partition comprising a metallic strip having a plurality of open frames therein and connecting webs overturned at opposite ends upon themselves to provide spaced wings extending from opposite sides of the partitions and having attaching flanges at their lower edges between the wings, said partitions being arranged on the belt in closely spaced relation to provide individual egg compartments between the wings and the frames, flexible sheets secured over the open frames of the partitions to provide flexible supports for the eggs, said belt having openings therein at the bottoms of the compartments to expose the eggs therethrough, a reversely operating belt arranged beneath the upper run of the first belt to engage the exposed portions of the eggs for turning the same, and lights arranged beneath the upper run of the first belt closely adjacent to the rear end of the second belt for illuminating the eggs immediately subsequent to agitation.

WILLIAM L. HOLZMANN.